(12) United States Patent
Matsumura et al.

(10) Patent No.: US 10,108,173 B2
(45) Date of Patent: Oct. 23, 2018

(54) NUMERICAL CONTROL DEVICE

(71) Applicant: FANUC CORPORATION, Yamanashi (JP)

(72) Inventors: Hiroshi Matsumura, Yamanashi (JP); Makoto Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 64 days.

(21) Appl. No.: 15/470,011

(22) Filed: Mar. 27, 2017

(65) Prior Publication Data
US 2017/0285606 A1    Oct. 5, 2017

(30) Foreign Application Priority Data
Mar. 30, 2016    (JP) ................................ 2016-067073

(51) Int. Cl.
G05B 19/31    (2006.01)
G05B 19/416    (2006.01)

(52) U.S. Cl.
CPC ......... *G05B 19/31* (2013.01); *G05B 19/4163* (2013.01); *G05B 2219/37582* (2013.01); *G05B 2219/45044* (2013.01)

(58) Field of Classification Search
None
See application file for complete search history.

(56) References Cited

U.S. PATENT DOCUMENTS

| | | | | |
|---|---|---|---|---|
| 5,043,644 A | * | 8/1991 | Sasaki | G05B 19/4068 318/568.1 |
| 5,315,523 A | * | 5/1994 | Fujita | G05B 19/4069 700/180 |
| 5,396,160 A | * | 3/1995 | Chen | B25J 9/1664 318/571 |
| 5,793,635 A | * | 8/1998 | Niwa | G05B 19/406 318/570 |

(Continued)

FOREIGN PATENT DOCUMENTS

| | | |
|---|---|---|
| JP | S63-173103 A | 7/1988 |
| JP | S63309688 A | 12/1988 |

(Continued)

OTHER PUBLICATIONS

Japanese Office Action dated May 29, 2016, for Japanese Patent Application No. 2016-067073.

*Primary Examiner* — Ramesh B Patel
(74) *Attorney, Agent, or Firm* — Karceski IP Law, PLLC

(57) ABSTRACT

A numerical control device that controls servomotors configured to process a workpiece into an arbitrary finishing shape by performing a plurality of processing operations so that the tool moves along a processing locus, the numeral control device includes: an initial locus deriving unit configured to derive the processing locus based on the arbitrary finishing shape; a processed range acquiring unit configured to acquire a processed range in which the tool has performed the processing operation; a receiving unit configured to receive a processing instruction for a changed finishing shape different from the arbitrary finishing shape; and a (Continued)

changed locus deriving unit configured to derive a changed processing locus based on a shape of a changed processed part obtained by excluding the processed range from the changed finishing shape at the time of interruption of the processing.

9 Claims, 7 Drawing Sheets

(56) References Cited

U.S. PATENT DOCUMENTS

| | | | | |
|---|---|---|---|---|
| 5,808,432 | A * | 9/1998 | Inoue | G05B 19/4069 |
| | | | | 318/561 |
| 6,498,962 | B2 * | 12/2002 | Sugiyama | B23H 7/20 |
| | | | | 700/162 |
| 9,268,323 | B2 * | 2/2016 | Otsuki | G05B 19/19 |
| 9,377,772 | B2 * | 6/2016 | Koide | G05B 19/182 |
| 9,599,978 | B2 * | 3/2017 | Haga | G05B 19/182 |
| 2013/0166044 | A1 * | 6/2013 | Hon | B23Q 17/20 |
| | | | | 700/61 |
| 2015/0012125 | A1 * | 1/2015 | Haga | G05B 19/182 |
| | | | | 700/160 |
| 2016/0271718 | A1 * | 9/2016 | Fagan | B23K 10/006 |

FOREIGN PATENT DOCUMENTS

| | | |
|---|---|---|
| JP | H02155004 A | 6/1990 |
| JP | H06193353 A | 7/1994 |
| JP | H08057747 A | 3/1996 |
| JP | H10-198412 A | 7/1998 |
| JP | 2002-86330 A | 3/2002 |
| JP | 2006-107233 A | 4/2006 |
| JP | 2015011669 A | 1/2015 |
| JP | 5813058 B | 11/2015 |

* cited by examiner

US 10,108,173 B2

NUMERICAL CONTROL DEVICE

CROSS-REFERENCE TO RELATED APPLICATIONS

This application is based on and claims priority to Japanese Patent Application No. 2016-067073, filed on Mar. 30, 2016, the entire content of which is incorporated herein by reference.

FIELD OF THE INVENTION

The present invention relates to a numerical control device configured to control a machine tool, and more specifically relates to a numerical control device configured to make a machine tool to perform multiple repetitive cycles in which a machining operation to make a tool cut into a workpiece and feed the tool is performed a plurality of times.

BACKGROUND OF THE INVENTION

Such a numerical control device is configured to automatically generate a locus of processing to be performed by a tool in accordance with an input finishing shape and transmit, to a tool driving unit, a command for moving the tool along this processing locus. Accordingly, the tool is moved to a processing start point on the processing locus, the workpiece is processed a plurality of times with a predetermined cutting amount, and then the workpiece is processed into the input finishing shape (for example, Japanese Unexamined Patent Application, Publication No. 2015-011669).

For example, the numerical control device generates, in accordance with the input finishing shape, a command including information on a tool path and a feeding speed which are for one cycle to conduct feeding with a predetermined cutting amount once, and feeds the information to the tool driving unit. When the finishing shape is not reached with this cycle, the numerical control device generates a tool path and a feeding speed of the next one cycle, and continues producing such cycles until a cutting position reaches the finishing shape.

SUMMARY OF THE INVENTION

In the above-described numerical control device, for example, when the finishing shape needs to be changed in the middle of processing the workpiece after the command is fed from the numerical control device to the tool driving unit, the processing is interrupted in the middle of a cycle currently being performed or at the end of this cycle. Then, the processing is performed again after the finishing shape is changed, but when the changed finishing shape requires the tool to be fed to a deeper side of the finishing shape before the change, starting the processing from the position of the interruption may cause interference between the tool and the workpiece.

For example, as illustrated in FIG. 14, after a tool T is fed to position L1 by a cutting amount with which the tool T reaches the position of outside diameter D1, the processing is interrupted in the middle of feeding the tool T to position L1 by a cutting amount with which the tool T reaches the position of outside diameter D2. When processing for a changed finishing shape needs to be performed to position L2, which is positioned at a deeper side of L1, for both of the position of outside diameter D1 and the position of outside diameter D2, starting the processing at a position of the interruption may cause interference between the tool T and the workpiece.

Typically, a finishing shape is not changed in the middle of processing, avoiding such unnecessary interference between the tool and the workpiece.

When a finishing shape needs to be changed in the middle of processing, the tool is made to perform the processing operation again from the processing start point for a changed finishing shape so as to avoid the above-described interference. Thus, the tool performs the processing operation on an already processed part as well, taking a longer processing time accordingly.

The present invention is intended to make an improvement in the aforementioned circumstances and provide a numerical control device that allows change of the finishing shape in the middle of processing and prevents unnecessary increase in a processing time due to the change of the finishing shape.

The present invention employs the following means to solve the above-described problem.

A first aspect of the present invention is a numerical control device that controls a tool driving unit configured to process a workpiece into an arbitrary finishing shape by performing a plurality of processing operations each of which makes a tool cut into the workpiece and feed the tool, so that the tool moves along a processing locus to perform the processing operations. The numerical control device includes an initial locus deriving unit configured to derive the processing locus based on the arbitrary finishing shape, a processed range acquiring unit configured to acquire a processed range in which the tool has performed the processing operation along the derived processing locus, a receiving unit configured to receive a processing instruction for a changed finishing shape different from the arbitrary finishing shape, and a changed locus deriving unit configured to derive a changed processing locus based on a shape of a changed processed part obtained by excluding the processed range from the changed finishing shape when the receiving unit has received the processing instruction for the changed finishing shape at the time of interruption of the processing along the processing locus.

In this aspect, the processed range in which the tool has performed the processing operation along the processing locus derived by the initial locus deriving unit is acquired, and the changed locus deriving unit derives the changed processing locus based on the shape of the changed processed part obtained by excluding the processed range from the changed finishing shape. Since the changed processing locus is derived based on the shape of the changed processed part with the processed range taken into consideration in the aforementioned manner, interference between the tool and the workpiece can be avoided when processing after the change of the finishing shape is started from, for example, the point of the interruption of the processing.

In the above-described aspect, the changed locus deriving unit preferably derives the changed processing locus so that the processing is performed on a part of the shape of the changed processed part prior to other parts, wherein the part is the nearest to a processing start side position in a cutting direction in which the tool is made to cut into the workpiece.

With this configuration, the possibility of the interference between the tool and the workpiece can be further reduced.

In the above-described aspect, the changed locus deriving unit more preferably determines whether the shape of the changed processed part has a part positioned at a processing start side relative to the position of the tool at the time of the interruption, in a cutting direction in which the tool is made to cut into the workpiece, and derives the changed processing locus so that the processing is performed on the part prior to other parts when presence of the part is determined.

In this aspect, whether the shape of the changed processed part with the processed range taken into consideration has a part to be processed positioned at the processing start side relative to the position of the tool at the time of the interruption is determined, and presence the changed processing locus is derived so that the processing is performed on the part prior to other parts when presence of the part is determined. Thus, the possibility of the interference between the tool and the workpiece is more reliably reduced.

In the above-described aspect, the changed locus deriving unit preferably determines that the part positioned at the processing start side exists when a deeper-side form line of the shape of the changed processed part or the changed finishing shape is positioned at a deeper side of a deeper-side form line of the arbitrary finishing shape, wherein the deeper side is defined to be a side opposite to a side on which the processing is started in a feeding direction of the tool.

In this aspect, in the determination of the presence of the part positioned at the processing start side, the position of the deeper-side form line of the shape of the changed processed part or the changed finishing shape is compared with the position of the deeper-side form line of the initial finishing shape. Thus, the presence of the part to be processed positioned at the processing start side relative to the position of the tool at the time of the interruption can be easily and reliably determined.

In the above-described aspect, the changed locus deriving unit preferably determines that the part positioned at the processing start side exists when a deeper-side form line of the shape of the changed processed part or the changed finishing shape intersects with a deeper-side form line of the arbitrary finishing shape, wherein the deeper side is defined to be a side opposite to a side on which the processing is started in a feeding direction of the tool.

In this aspect, the presence of the part positioned at the processing start side relative to the position of the tool at the time of the interruption is determined based on whether the deeper-side form line of the changed processed part shape or the changed finishing shape intersects with the deeper-side form line of the initial finishing shape. Thus, the presence of the part to be processed positioned at the processing start side relative to the position of the tool at the interruption can be easily and reliably determined.

In the above-described aspect, the changed locus deriving unit preferably derives the changed processing locus so that movement of the tool is started from the position of the tool at the time of the interruption.

According to this aspect, the movement of the tool and the processing performed by the tool can be started from the position of the interruption, which is advantageous in reduction of a processing time after the change of the finishing shape.

In the above-described aspect, the changed locus deriving unit preferably derives the changed processing locus so that the processing performed by the tool is started after the tool is moved at a faster speed from a movement resuming position of the tool to the starting side relative to a deeper-side form line of the changed processed part shape, when the position of the tool at the time of the interruption is positioned at the deeper side relative to the deeper-side form line of the changed processed part shape, wherein the deeper side is defined to be a side opposite to the starting side from which the processing is started in a feeding direction of the tool.

According to this aspect, a time taken for moving from the movement resuming position of the tool to a processing resuming position can be reduced, which is advantageous in reduction of a processing time after the change of the finishing shape.

In the above-described aspect, the changed locus deriving unit preferably derives the changed processing locus so that the processing is started by feeding the tool toward a deeper side from a movement resuming position of the tool, when the position of the tool at the time of the interruption is positioned at the starting side relative to a the deeper-side form line of the changed processed part shape, wherein the deeper side is defined to be a side opposite to the starting side from which the processing is started in a feeding direction of the tool.

According to this aspect, the processing of the workpiece is started at the movement resuming position of the tool, which is advantageous in reduction of a processing time after the change of the finishing shape.

In the above-described aspect, the numerical control device is preferably configured to move the tool at a fast speed toward the part to be processed prior to the other parts while avoiding contact with the workpiece.

According to this aspect, reduction can be achieved in the possibility of the interference between the tool and the workpiece, and simultaneously in a time until the processing performed by the tool is started.

The present invention allows change of a finishing shape in the middle of processing and prevents unnecessary increase in a processing time due to the change of the finishing shape.

DESCRIPTION OF EMBODIMENTS

A numerical control device according to a first embodiment of the present invention will be described below with reference to the accompanying drawings.

Figure 1:
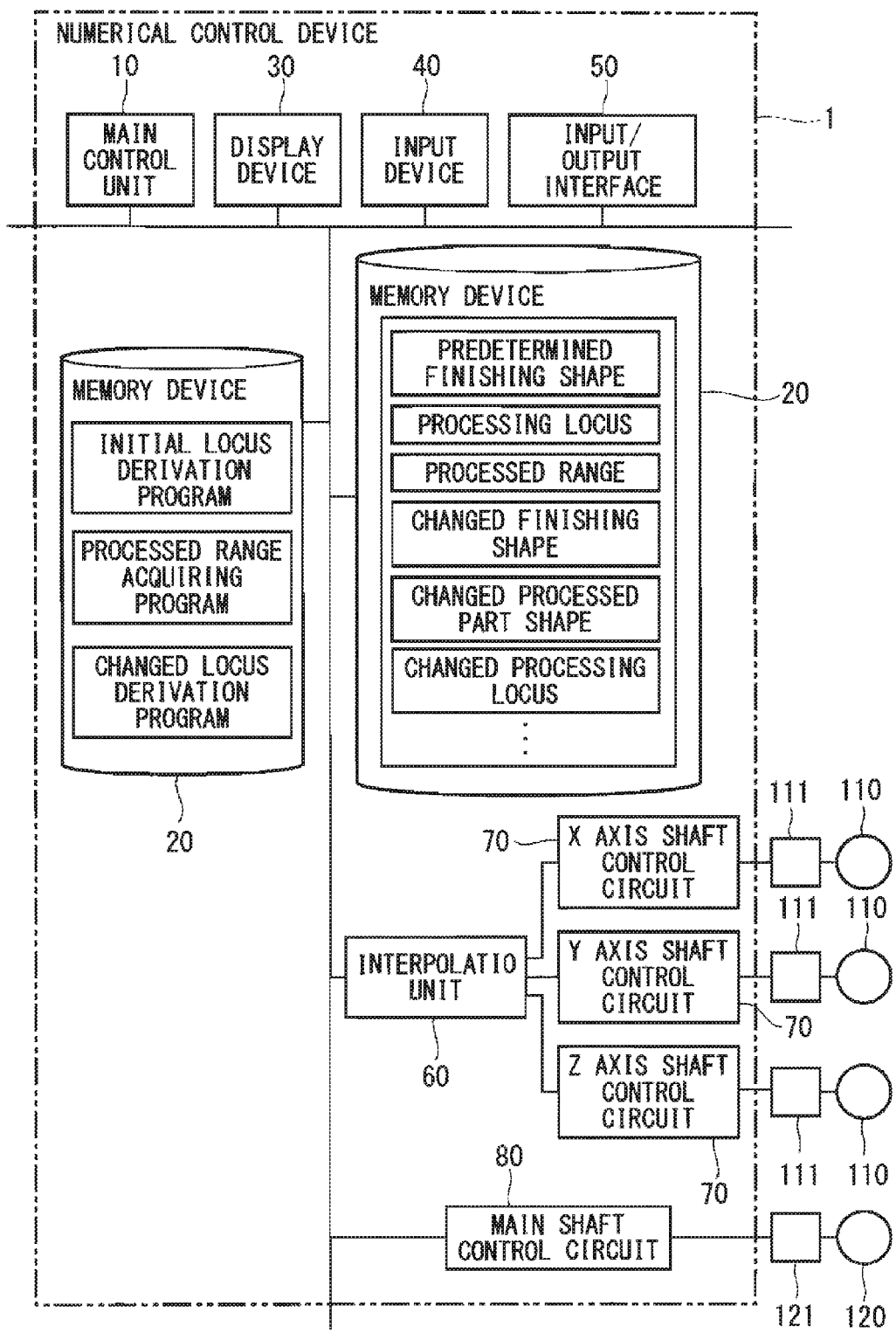
FIG. 1 is a schematic configuration diagram of a numerical control device according to a first embodiment of the present invention.

As illustrated in FIG. 1, this numerical control device 1 includes, for example, a main control unit 10 as a computer including a CPU and a memory, a memory device 20 including a storage memory such as a non-volatile memory or a hard disk and a temporary memory such as a RAM, a display device 30 such as a liquid crystal display device, an input device 40 such as an operation panel including an input key, an input/output interface 50 configured to perform signal communication externally, an interpolation unit 60, three shaft control circuits 70 configured to control an X axis, a Y axis, and a Z axis, respectively, and a main shaft control circuit 80.

The interpolation unit 60 produces detailed locus data for processing by interpolating points in rough locus data for processing received from the main control unit 10, and transmits, to each servo amplifier 111 through the corresponding shaft control circuit 70, a signal for operating a servomotor 110 of the corresponding shaft in accordance with the detailed locus data. The interpolation unit 60 is configured to transmit, to the main control unit 10, for example, movement information on each shaft based on at least one of an actuation state of the corresponding servomotor 110 received from the corresponding servo amplifier 111 and the detailed locus data thus produced.

Each shaft control circuit 70 receives an operation instruction signal distributed from the interpolation unit 60 to the corresponding shaft, and transmits a signal to the servo amplifier 111 of the shaft based on the received operation instruction signal. Each servo amplifier 111 receives the signal and drives the corresponding servomotor 110 as a tool driving unit provided at the shaft. The servomotor 110 of the each shaft includes a position detector and a speed detector, and performs position and speed feedback control by feeding back, to the shaft control circuits 70, position and speed signals from these detectors. The position signal from these detectors may be transmitted to the main control unit 10 as the movement information of the each shaft. In addition, a tool position detector configured to detect the position of a tool holder holding a tool may be provided, and a position signal from the tool position detector may be transmitted to the main control unit 10 as the movement information of the each shaft.

Drive current output from each servo amplifier 111 to the corresponding servomotor 110 is detected by a current detector and fed back to the corresponding shaft control circuits 70 to perform current (torque) control. The main shaft control circuit 80 receives a rotation instruction signal from the main control unit 10, and transmits a signal to a main shaft amplifier 121 based on the received rotation instruction signal. The main shaft amplifier 121 receives this signal and makes a main shaft motor 120 to rotate a main shaft at a rotational speed in accordance with this signal. The main shaft is provided with a rotational speed detector configured to detect the rotational speed, and a detected rotational speed is fed back to the main shaft control circuit 80 to control the rotational speed of the main shaft. Alternatively, the main shaft control circuit 80 may receive the rotation instruction signal from the interpolation unit 60 and make the main shaft motor 120 to rotate at a rotational speed in accordance with this rotation instruction signal.

The present technology is applied to, for example, a lathe with which a workpiece rotates, and the main shaft is provided with a chuck configured to hold the workpiece. A tool is attached to a tool holder configured to be moved by the respective servomotors 110 in the directions of the X axis, the Y axis and the Z-axis, and processing of the workpiece is performed by moving the tool holder to contact the tool being fixed to the tool holder with the workpiece rotating together with the main shaft.

Figure 3:
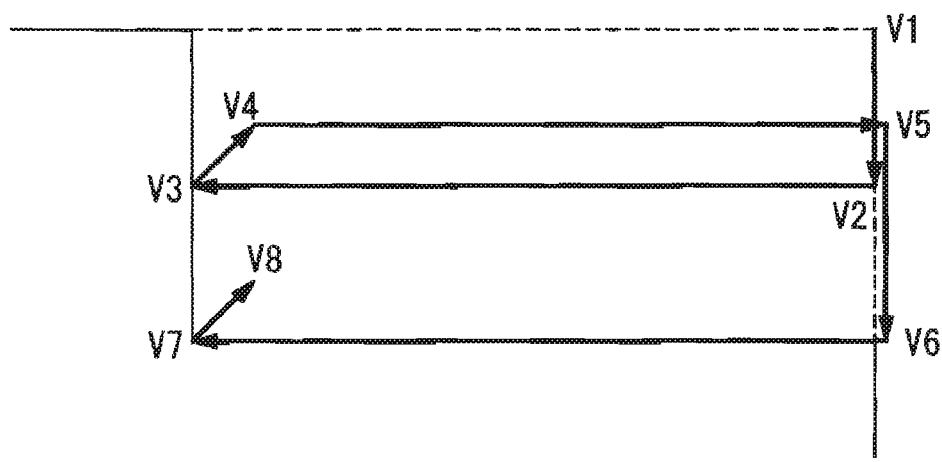
FIG. 3 is a diagram illustrating an example of an initial processing locus according to the first embodiment.

FIG. 3 is a diagram explaining an example of rough locus data for processing of multiple repetitive cycles. In this example, processing to achieve an arbitrary finishing shape is performed by making a tool to cut in an X direction and feeding the tool in a Z direction. This rough locus data is generated based on data of the arbitrary finishing shape stored in the memory device 20 by the main control unit 10 operating based on an initial locus derivation program stored in the memory device 20. The data of the arbitrary finishing shape is received by the input device 40 and the input/output interface 50. The data of the finishing shape received by the input/output interface 50 is part of CAD data in some cases.

Figure 2:
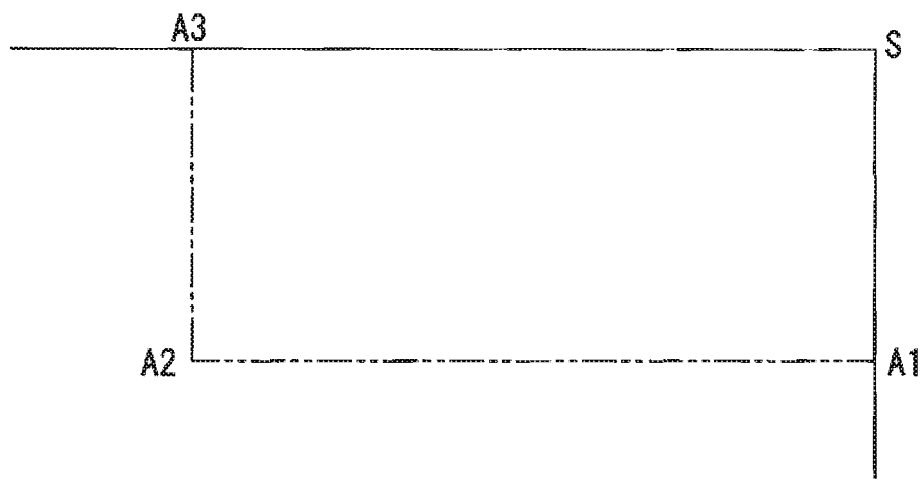
FIG. 2 is a diagram illustrating an example of an initial finishing shape according to the first embodiment.

The finishing shape received by the input device 40 may include, for example, X and Z positions (processing start point) at the start of processing (X and Z positions of point S illustrated in FIG. 2), maximum cutting positions X and Z (X and Z positions of point A1 illustrated in FIG. 2) for the Z coordinate position of the processing start point, maximum feeding positions (X and Z positions of point A3 illustrated in FIG. 2) at the X coordinate position of the processing start point, and X and Z positions (processing end point) at the end of processing (X and Z positions of point A2 illustrated in FIG. 2). In the following description, the tool is made to cut in the X-axis direction and fed in the Z-axis direction. A side opposite to a processing start side in the Z-axis direction (feeding direction) is referred to as a deeper side in some cases.

Having received the arbitrary finishing shape data, the main control unit 10 produces the rough locus data for processing as illustrated in FIG. 3 by referring to, for example, the kind of the tool and the material of a workpiece. The rough locus data illustrated in FIG. 3 includes X-Z coordinate data V1 of processing start point S, X-Z coordinate data V2 of a position to which cutting is performed into the workpiece by a predetermined amount from processing start point S, X-Z coordinate data V3 of the position of the finishing shape with the cutting amount of X-Z coordinate data V2, X-Z coordinate data V4 of a position to which the tool being at the position of X-Z coordinate data V3 is moved off the workpiece, X-Z coordinate data V5 having an X position same as that of X-Z coordinate data V4 and a Z position same as that of processing start point S, X-Z coordinate data V6 of a position to which cutting is performed into the workpiece by a predetermined amount from the position of X-Z coordinate data V5, X-Z coordinate data V7 (processing end point) of the backmost position of the finishing shape with the cutting amount of X-Z coordinate data V6, and X-Z coordinate data V8 of a position to which the tool being at the position of X-Z coordinate data V7 is moved off the workpiece. The tool path of one cycle is constituted by X-Z coordinate data V1, V2, V3, V4, and V5, and the tool path of the next one cycle is constituted by X-Z coordinate data V5, V6, V7, and V8.

The interpolation unit 60 receives this rough locus data for processing and produces detailed locus data for processing by interpolating points in the rough locus data.

When the input device 40 or the input/output interface 50 receives an interruption instruction for interrupting the processing while the servomotors 110 and the main shaft motor 120 are actuated based on this detailed locus data and processing of the workpiece is performed, the main control unit 10 controls the servomotor 110 of each shaft through the interpolation unit 60 and the corresponding shaft control circuit 70 and also the main shaft motor 120 through the main shaft control circuit 80 to interrupt the processing of the workpiece.

When this interruption instruction is received, the processing may be interrupted at the end of one cycle of the current processing or in the middle of this one cycle. The following first describes a case in which the processing is interrupted in the middle of one cycle.

Figure 4:
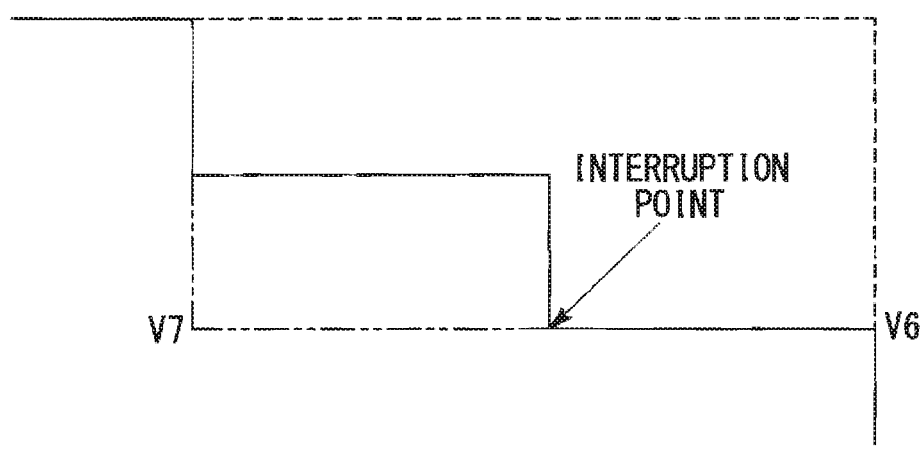
FIG. 4 is a diagram illustrating the shape of a workpiece when processing along the initial processing locus according to time the first embodiment is interrupted.

For example, when the interruption occurs while the processing is performed from the position of V6 toward the position of V7, the workpiece has a shape as illustrated in FIG. 4.

At this time, the main control unit 10 operates based on a processed range acquiring program stored in the memory device 20 to acquire, based on the movement information of each shaft, a processed range of a processing operation performed by the tool until the interruption, and store the processed range in the memory device 20.

Then, when having received a changed finishing shape and a processing instruction for this changed finishing shape from the input device 40 or the input/output interface 50, the main control unit 10 operates based on a changed locus derivation program stored in the memory device 20 to first obtain a changed processed part shape by excluding the processed range from the changed finishing shape, and store the changed processed part shape in the memory device 20. The changed finishing shape and a processing instruction thereof may be stored in the memory device 20 before the interruption of the processing.

Figure 5:
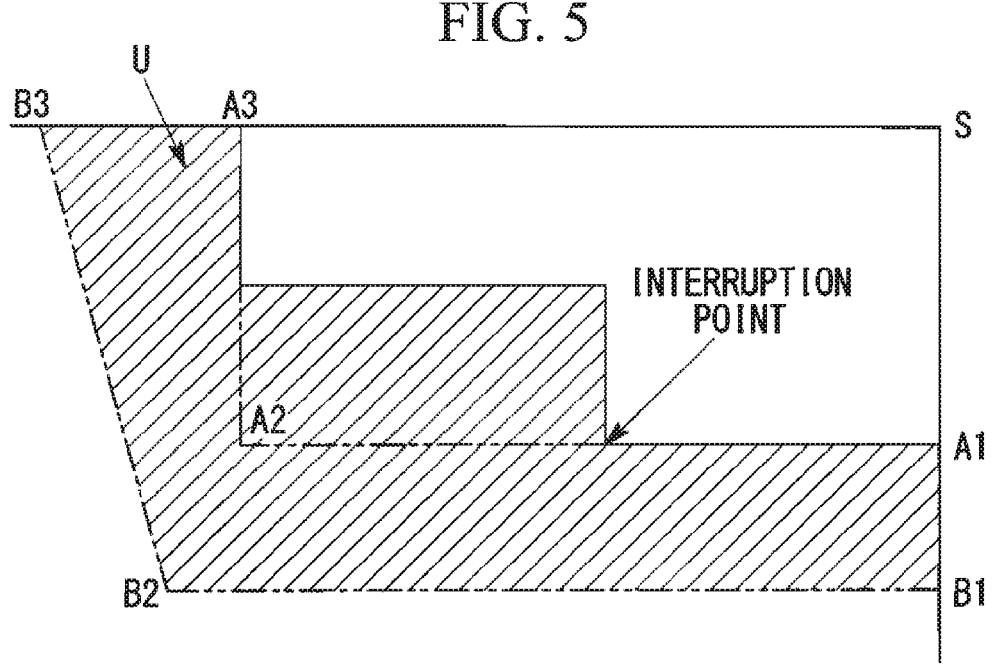
FIG. 5 is a diagram illustrating a first example of a changed finishing shape and a changed processed part shape according to the first embodiment.

For example, when the changed finishing shape is a region surrounded by points S, B1, B2 and B3 illustrated in FIG. 5, the changed processed part shape is the hatched region illustrated in FIG. 5.

Subsequently, the main control unit 10 determines whether the changed processed part shape has a part positioned at a processing start side of the position of the tool at the interruption, in a cutting direction (in the present embodiment, the X-axis direction) in which the tool cuts the workpiece. In FIG. 5, the changed processed part shape has part U at the upper side (processing start side) of the position of the tool at the interruption in the X-axis direction, and thus presence of this part is determined.

Figure 6:
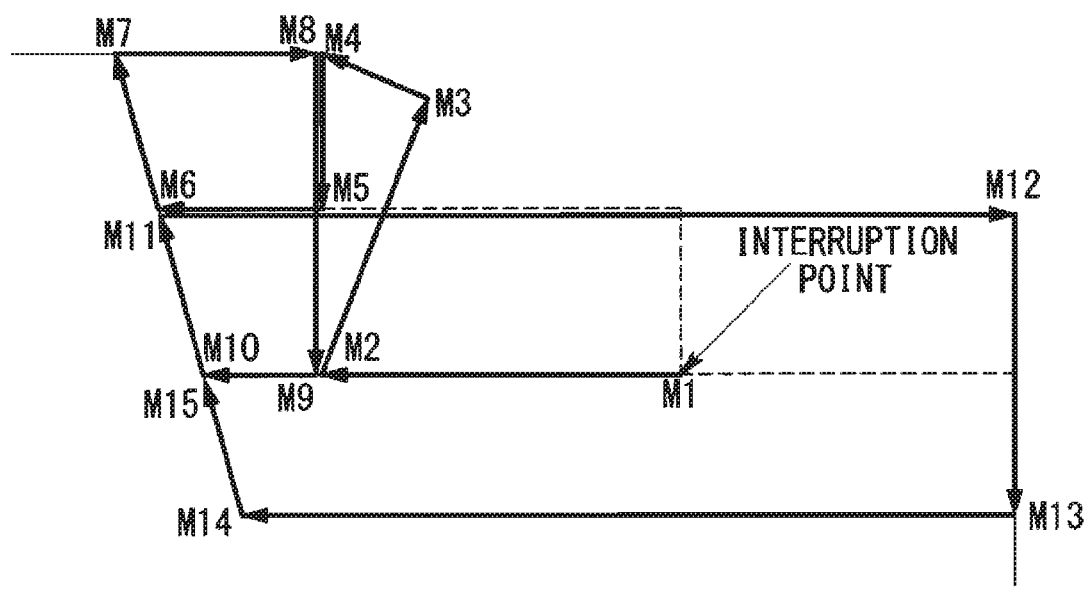
FIG. 6 is a diagram illustrating a first example of a changed processing locus according to the first embodiment.

Then, the main control unit 10 produces changed rough locus data for processing as illustrated in FIG. 6 by referring to, for example, the kind of the tool and the material of the workpiece so that the processing is performed prior to other parts on part U at the processing start side of the position of the tool at the time of interruption. The changed rough locus data illustrated in FIG. 6 includes X-Z coordinate data M1 of an interruption point as a changed processing start point, X-Z coordinate data M2 of the backmost position of the initial finishing shape with the cutting amount of X-Z coordinate data M1 or a position slightly closer to the processing start point than the backmost position, X-Z coordinate data M3 of a position to which the tool being at the position of X-Z coordinate data M2 is moved off the workpiece, X-Z coordinate data M4 of a position closest to processing start point S in part U at the processing start side of the position of the tool at the interruption, X-Z coordinate data M5 of a position to which cutting is performed from the position of X-Z coordinate data M4 into the workpiece by a predetermined amount, X-Z coordinate data M6 of the backmost position of a changed finishing shape with the cutting amount of X-Z coordinate data M5, and the following X-Z coordinate data M7 to M15 illustrated in FIG. 6.

The interpolation unit 60 receives the changed rough locus data for processing and produces changed detailed locus data for processing by interpolating points in this changed rough locus data. Then, each servomotor 110 and the main shaft motor 120 actuate based on the changed detailed locus data to perform processing of the workpiece. In the following description, the changed detailed locus data is produced through the interpolation of points in the changed rough locus data, and the processing of the workpiece is performed based on the changed detailed locus data.

In the above-described case, the movement of the tool and the processing are started at the position of the interruption, thereby achieving a reduced processing time after the change of the finishing shape. In addition, whether the changed processed part shape with the processed range taken into consideration has a part to be processed positioned at the processing start side of the position of the tool at the interruption is determined, and when presence of this part is determined, a changed processing locus is derived so that the processing is performed on this part prior to other parts. Thus, the possibility of the interference between the tool and the workpiece is reduced.

In the determination of whether the changed processed part shape has part U at the processing start side of the position of the tool at the interruption, in the cutting direction in which the tool is made to cut into the workpiece (in the present embodiment, the X-axis direction), the main control unit 10 may operate based on the changed locus derivation program stored in the memory device 20 and may determine the presence of part U at the processing start side when the deeper-side form line of the changed processed part shape is positioned at the deeper side of the deeper-side form line of the initial finishing shape in the feeding direction. In the present embodiment, the deeper-side form line of the changed processed part shape is a line connecting B2 and B3 illustrated in FIG. 5, and the deeper-side form line of the initial finishing shape is a line connecting A2 and A3 illustrated in FIG. 2. The above-described determination may be performed when the deeper-side form line of the changed finishing shape is positioned at the deeper side of the deeper-side form line of the initial finishing shape in the feeding direction.

In this case, presence of part U at the processing start side can be easily and reliably determined, which is advantageous in preventing interference between the tool and the workpiece.

The movement of the tool may be performed at a faster speed from position M11 to position M12 illustrated in FIG. 6. In this case, reduction can be achieved in a processing time after the change of the finishing shape.

Figure 7:
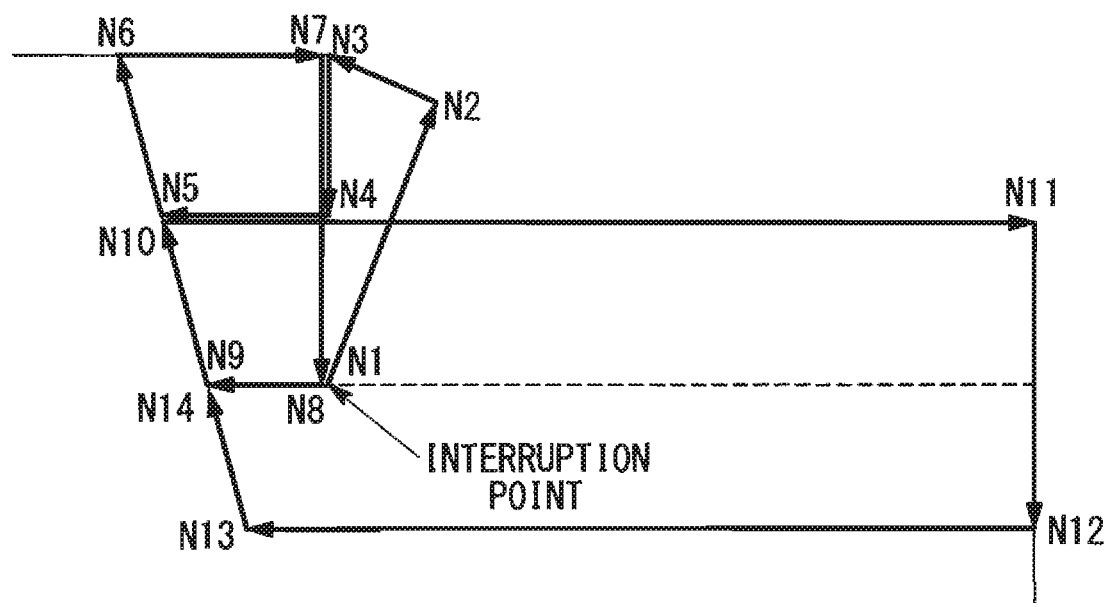
FIG. 7 is a diagram illustrating a second example of a changed processing locus according to the first embodiment.

Although FIGS. 5 and 6 illustrate the case in which the processing is interrupted in the middle of one cycle, FIG. 7 illustrates an example of a changed rough locus data for processing when the processing is interrupted at end of one cycle. The changed rough locus data illustrated in FIG. 7 includes X-Z coordinate data N1 of an interruption point as the changed processing start point, and the following X-Z coordinate data N2 to N14 illustrated in FIG. 7.

In this case, the tool can be fed at a faster speed from position N1 as the changed processing start point to position N3, thereby achieving reduction of a processing time after the change of the finishing shape.

In FIGS. 5 and 6, the deeper-side form line of the changed processed part shape positioned at the deeper side of the deeper-side form line of the initial finishing shape in the feeding direction is illustrated.

Figure 8:
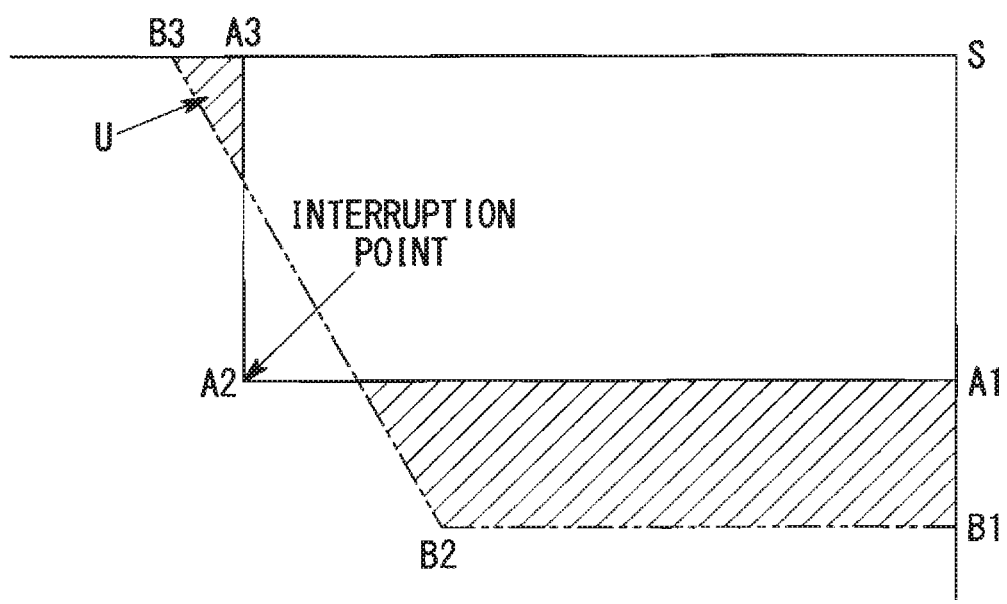
FIG. 8 is a diagram illustrating a second example of a changed finishing shape and a changed processed part shape according to the first embodiment.

However, as illustrated in FIG. 8, the deeper-side form line of the changed processed part shape intersects with the deeper-side form line of the initial finishing shape in some cases. In FIG. 8, the processing is interrupted when one cycle ends.

In this case, the main control unit 10 may be configured to operate based on the changed locus derivation program stored in the memory device 20 and determine the presence of part U at the processing start side when the deeper-side form line of the changed processed part shape intersects with the deeper-side form line of the initial finishing shape. The above-described determination may be performed when the deeper-side form line of the changed finishing shape intersects with the deeper-side form line of the initial finishing shape.

In this case, the presence of part U at the processing start side can be easily and reliably determined, which is advantageous in preventing the interference between the tool and the workpiece.

Figure 9:
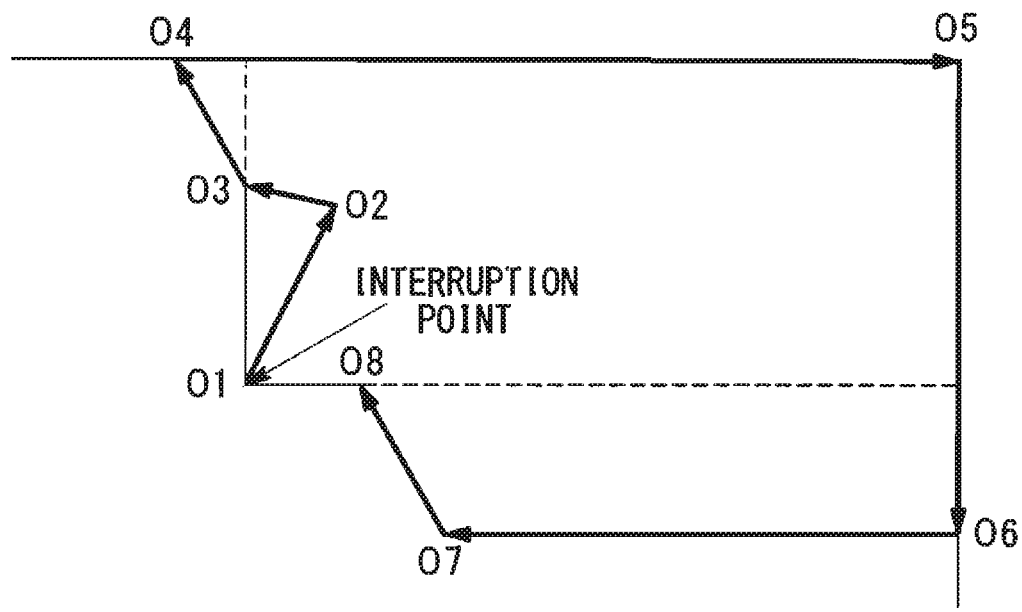
FIG. 9 is a diagram illustrating a third example of a changed processing locus according to the first embodiment.

When the deeper-side form lines intersect with each other as illustrated in FIG. 8, the main control unit 10 produces, for example, changed rough locus data for processing as illustrated in FIG. 9. The changed rough locus data illustrated in FIG. 9 includes X-Z coordinate data O1 of an interruption point as the changed processing start point, and the following X-Z coordinate data O2 to O8 illustrated in FIG. 9.

In this case, the tool is preferably moved at a faster speed from position O1 as the changed processing start point to position O3. In this manner, when the position of the tool at the time of interruption is positioned at the deeper side of the deeper-side form line of the changed processed part shape, a time taken for moving from the movement resuming position of the tool to a processing resuming position (position O3 in the example illustrated in FIG. 9) can be reduced by moving the tool at a faster speed from a movement resuming position of the tool (position of the interruption in the example illustrated in FIG. 9) to the processing start side of the deeper-side form line of the changed processed part shape.

Figure 10:
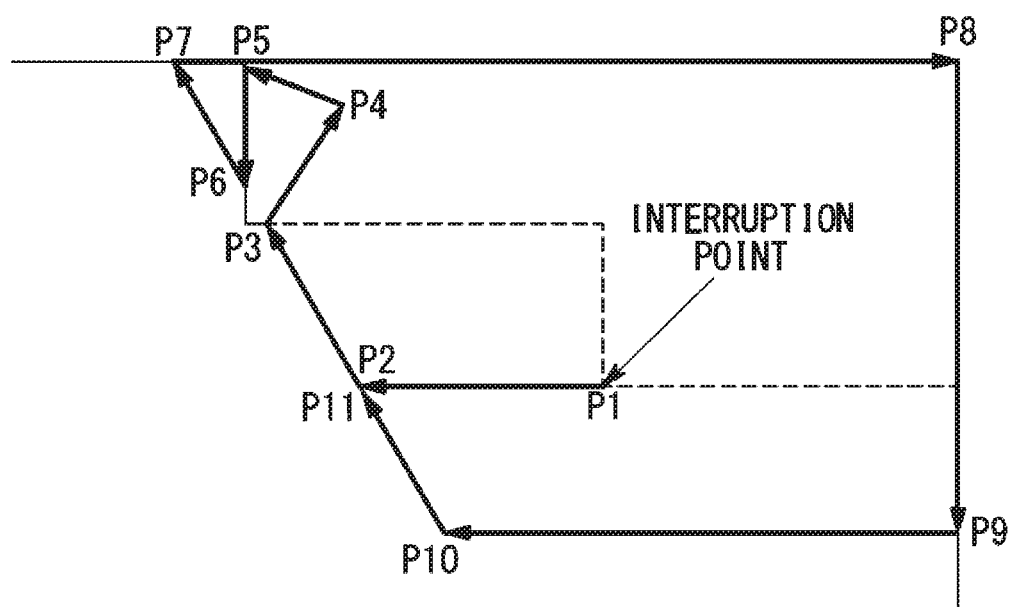
FIG. 10 is a diagram illustrating a fourth example of a changed processing locus according to the first embodiment.

When the deeper-side form line of the changed processed part shape intersects with the deeper-side form line of the initial finishing shape and the processing is interrupted in the middle of one cycle, changed rough locus data for processing as illustrated in, for example, FIG. 10 is produced. The changed rough locus data for processing illustrated in FIG. 10 includes X-Z coordinate data P1 of an interruption point as the changed processing start point, and the following X-Z coordinate data P2 to P11 illustrated in FIG. 10.

In this case, in order to reduce/shorten the processing time, it is preferable to move the tool at a faster speed from position R3 to position R5.

In FIGS. 6, 7, 9, and 10, a changed rough locus is derived so that the processing is performed on part of the changed processed part shape prior to other parts, the part being positioned most on the processing start side in the cutting direction in which the tool is made to cut into the workpiece. In particular, in FIGS. 7 and 9, the changed rough locus is derived so that the processing is started at the part positioned most on the processing start side in the cutting direction in which the tool is made to cut into the workpiece. Thus, the possibility of the interference between the tool and the workpiece can be reduced.

Part of a locus from position V6 to position V7 in the rough locus data for processing for the initial finishing shape data illustrated in FIG. 3 is used as a locus from position M1 to position M2 in FIG. 6 and a locus from position P1 to position P2 in FIG. 10. As illustrated in FIGS. 6 and 10, part of a locus in the rough locus data for the initial finishing shape data can be used for a part other than part U positioned at the processing start side, and the following processing can be performed according to the locus in the rough locus data for the initial finishing shape data, thereby preventing complication in the derivation of a processing locus.

FIGS. 5 to 10 illustrate the case in which the deeper-side form line of the changed processed part shape is positioned at the deeper side of the deeper-side form line of the initial finishing shape in the feeding direction, and the case in which the deeper-side form line of the changed processed part shape intersects with the deeper-side form line of the initial finishing shape.

Figure 11:
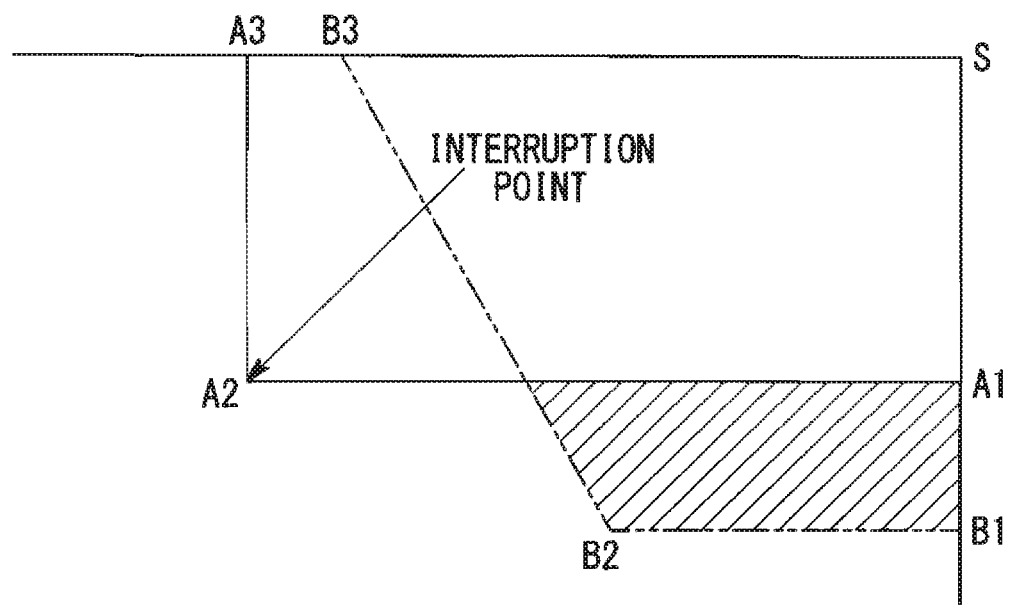
FIG. 11 is a diagram illustrating a third example of a changed finishing shape and a changed processed part shape according to the first embodiment.

However, as illustrated in FIG. 11, the deeper-side form line of the initial finishing shape is positioned at the deeper side of the deeper-side form line of the changed processed part shape in some cases. In FIG. 11, the processing is interrupted when one cycle ends.

Figure 12:
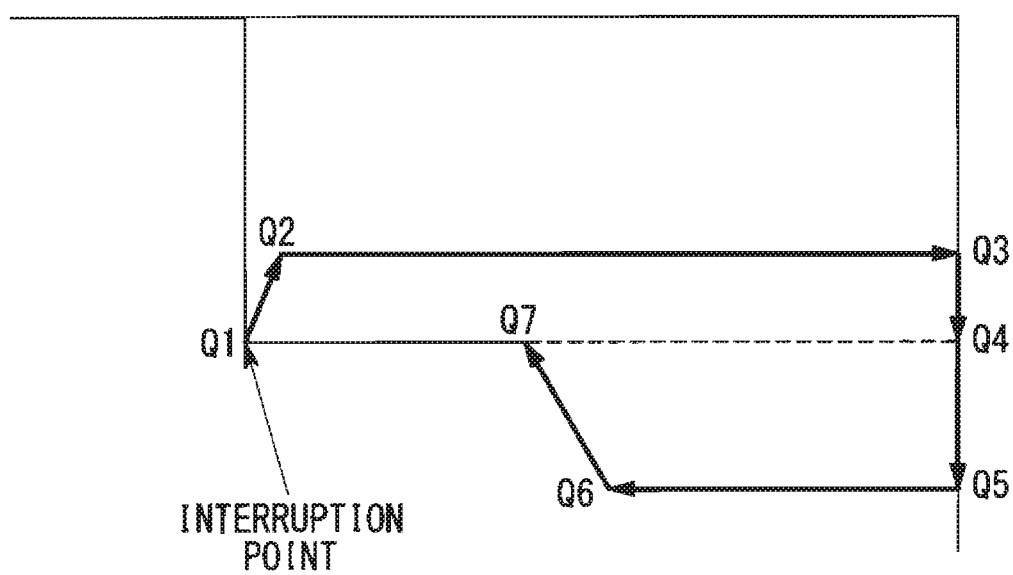
FIG. 12 is a diagram illustrating a fifth example of a changed processing locus according to the first embodiment.

When the deeper-side form line of the initial finishing shape is positioned at the deeper side of the deeper-side form line of the changed processed part shape as illustrated in FIG. 11, the main control unit 10 produces changed rough locus data for processing as illustrated in, for example, FIG. 12. The changed rough locus data illustrated in FIG. 12 includes X-Z coordinate data Q1 of an interruption point as the changed processing start point, and the following X-Z coordinate data Q2 to Q7 illustrated in FIG. 12.

In this case, the tool is preferably moved at a faster speed from position Q1 as the changed processing start point to position Q4. In this manner, when the position of the tool at the time of interruption is positioned at the deeper side of the deeper-side form line of the changed processed part shape, a time taken for moving from the movement resuming position of the tool to the processing resuming position (position Q4 in the example illustrated in FIG. 12) can be reduced by moving the tool at a faster speed from the movement resuming position of the tool (position of the interruption in the example illustrated in FIG. 12) to the processing start side of the deeper-side form line of the changed processed part shape.

Figure 13:
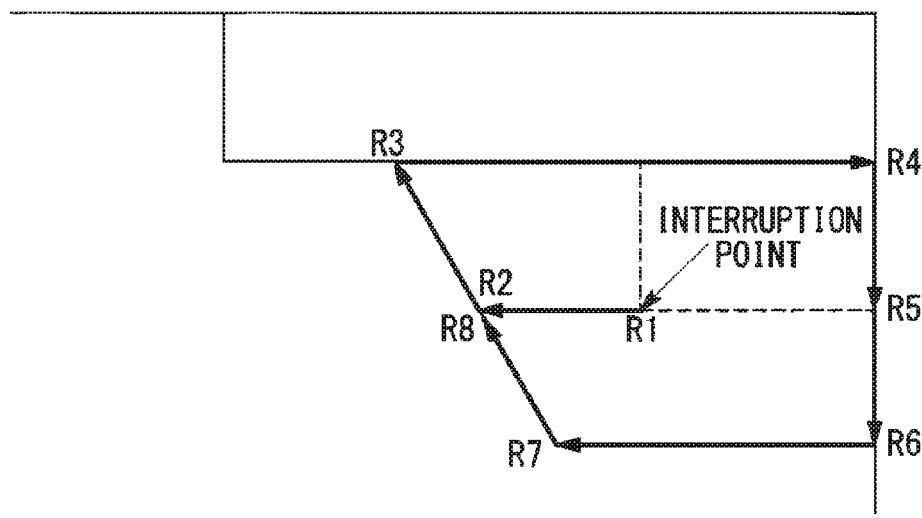
FIG. 13 is a diagram illustrating a sixth example of a changed processing locus according to the first embodiment.
Figure 14:
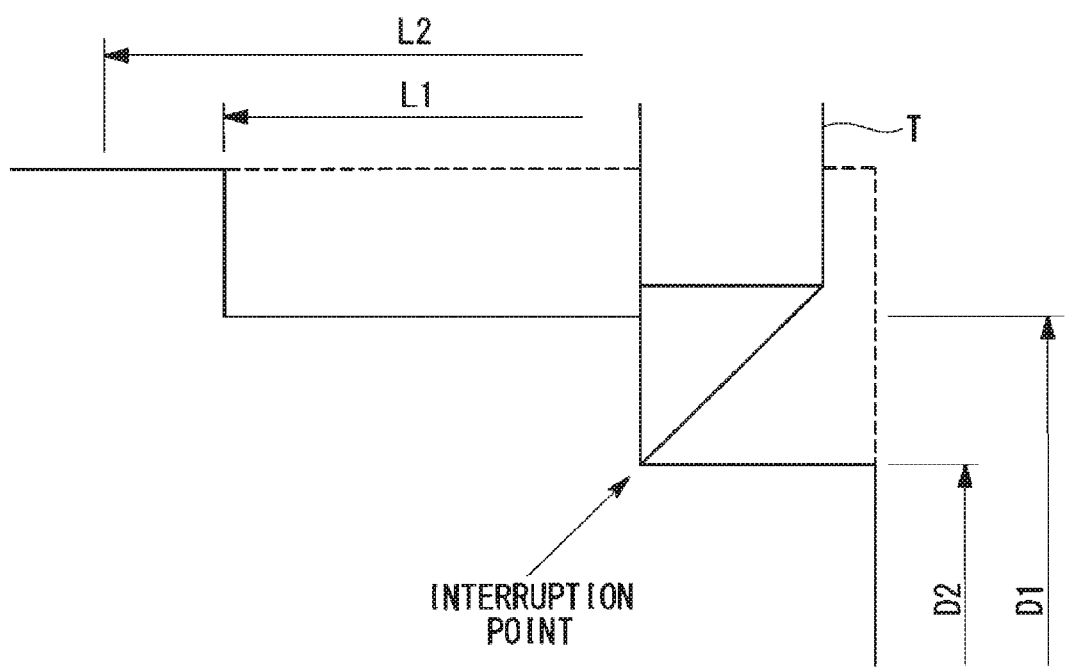
FIG. 14 is a diagram illustrating an example of a processing state.

When the deeper-side form line of the initial finishing shape is positioned at the deeper side of the deeper-side form line of the changed processed part shape and the processing is interrupted in the middle of one cycle, the changed rough locus data for processing as illustrated in, for example, FIG. 13 is produced. The changed rough locus data illustrated in FIG. 13 includes X-Z coordinate data R1 of an interruption point as the changed processing start point, and the following X-Z coordinate data R2 to R8 illustrated in FIG. 13.

Again, in order to reduce/shorten the processing time, it is preferable to move the tool at a faster speed from position R3 to position R5.

The invention claimed is:
1. A numeral control device that controls a tool driving unit configured to process a workpiece into an arbitrary finishing shape by performing a plurality of processing operations each of which makes a tool cut into the workpiece and feed the tool, so that the tool moves along a processing locus to perform the processing operations, the numeral control device comprising:

an initial locus deriving unit configured to derive the processing locus based on the arbitrary finishing shape;

a processed range acquiring unit configured to acquire a processed range in which the tool has performed the processing operation along the derived processing locus;

a receiving unit configured to receive a processing instruction for a changed finishing shape different from the arbitrary finishing shape; and a changed locus deriving unit configured to derive a changed processing locus based on a shape of a changed processed part obtained by excluding the processed range from the changed finishing shape when the receiving unit has received the processing instruction for the changed finishing shape at the time of interruption of the processing along the processing locus.

2. The numerical control device according to claim 1, wherein the changed locus deriving unit is configured to derive the changed processing locus so that the processing is performed on a part of the shape of the changed processed part prior to other parts, and wherein the changed processed part is the nearest to a processing start side position in a cutting direction in which the tool is made to cut into the workpiece.

3. The numerical control device according to claim 1, wherein the changed locus deriving unit determines whether the shape of the changed processed part has a part positioned at a processing start side relative to the position of the tool at the time of the interruption, in a cutting direction in which the tool is made to cut into the workpiece, and derives the changed processing locus so that the processing is performed on the changed processed part prior to other parts when presence of the changed processed part is determined.

4. The numerical control device according to claim 3, wherein the changed locus deriving unit determines that the changed processed part positioned at the processing start side exists when a deeper-side form line of the shape of the changed processed part or the changed finishing shape is positioned at a deeper side of a deeper-side form line of the arbitrary finishing shape, wherein the deeper side is defined to be a side opposite to a side on which the processing is started in a feeding direction of the tool.

5. The numerical control device according to claim 3, wherein the changed locus deriving unit determines that the changed processed part positioned at the processing start side exists when a deeper-side form line of the shape of the changed processed part or the changed finishing shape intersects with a deeper-side form line of the arbitrary finishing shape, wherein the deeper side is defined to be a side opposite to a side on which the processing is started in a feeding direction of the tool.

6. The numerical control device according to claim 1, wherein the changed locus deriving unit derives the changed processing locus so that movement of the tool is started from the position of the tool at the time of the interruption.

7. The numerical control device according to claim 6, wherein the changed locus deriving unit derives the changed processing locus so that the processing performed by the tool is started after the tool is moved at a faster speed from a movement resuming position of the tool to the starting side relative to a deeper-side form line of the changed processed part shape, when the position of the tool at the time of the interruption is positioned at the deeper side relative to the deeper-side form line of the changed processed part shape, wherein the deeper side is defined to be a side opposite to the starting side from which the processing is started in a feeding direction of the tool.

8. The numerical control device according to claim 6, wherein the changed locus deriving unit derives the changed processing locus so that the processing is started by feeding the tool toward a deeper side from a movement resuming position of the tool, when the position of the tool at the time of the interruption is positioned at the starting side relative to a the deeper-side form line of the changed processed part shape, wherein the deeper side is defined to be a side opposite to the starting side from which the processing is started in a feeding direction of the tool.

9. The numerical control device according to claim 2, wherein the numerical control device is configured to move the tool at a fast speed toward the part to be processed prior to the other parts while avoiding contact with the workpiece.

* * * * *